Sept. 29, 1964      J. H. RICHTER      3,150,773
MATERIAL FORMING PROCESS AND APPARATUS
Filed Jan. 4, 1963      4 Sheets-Sheet 1
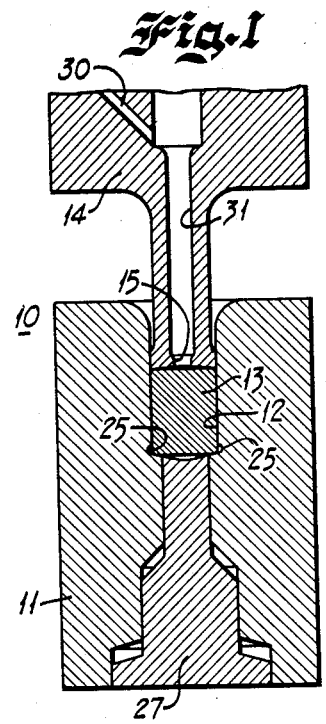
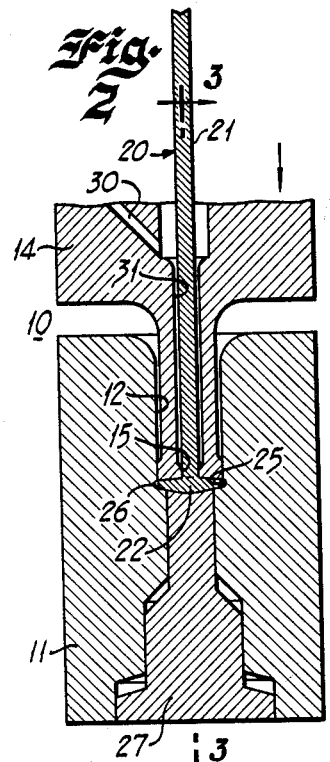
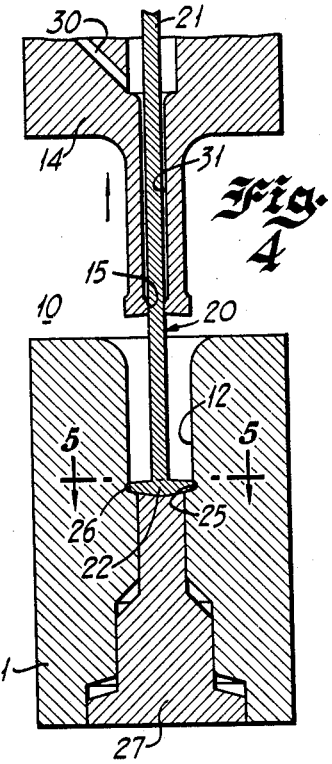
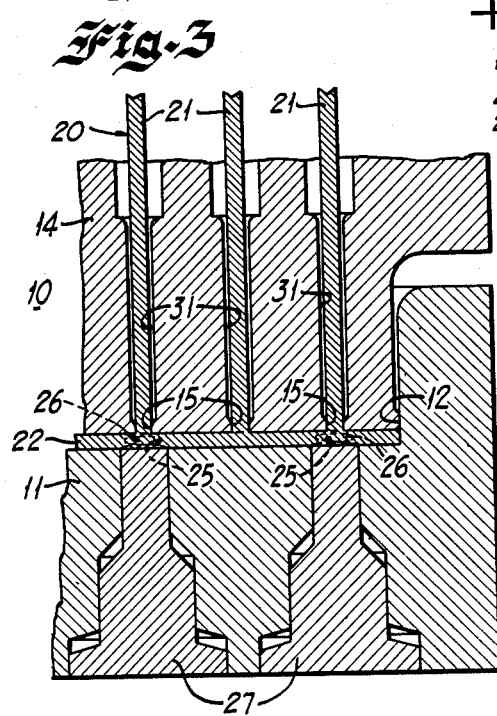
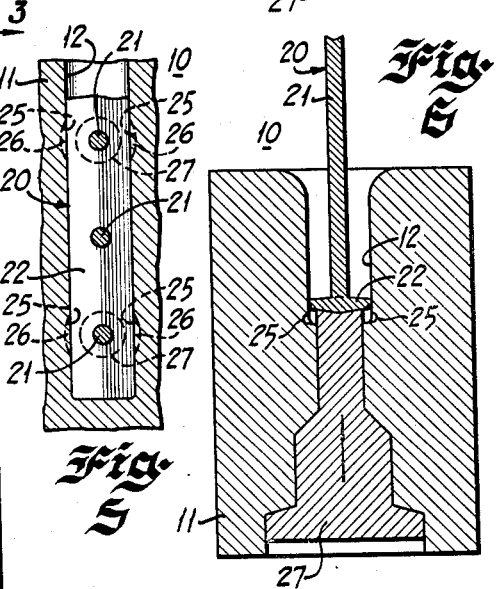
INVENTOR.
JOHN H. RICHTER
BY
Mason, Kolehmainen, Rathburn and Wyss
ATTORNEYS

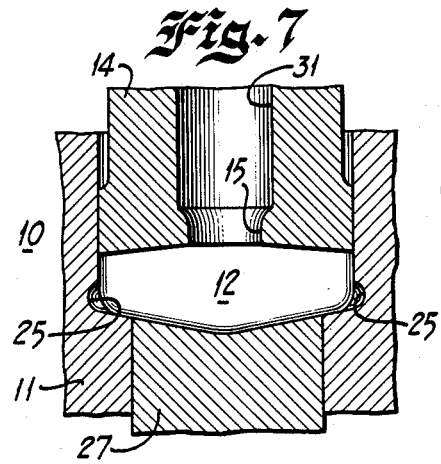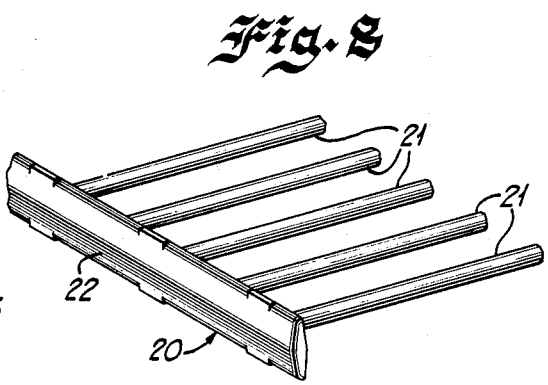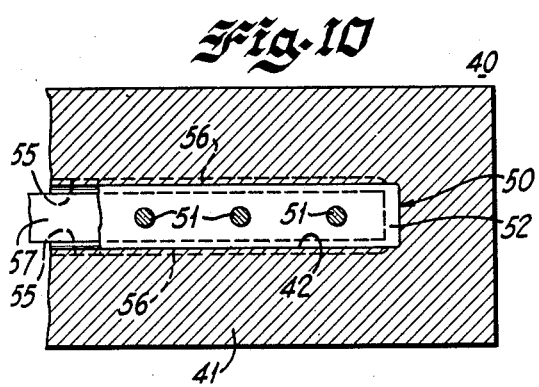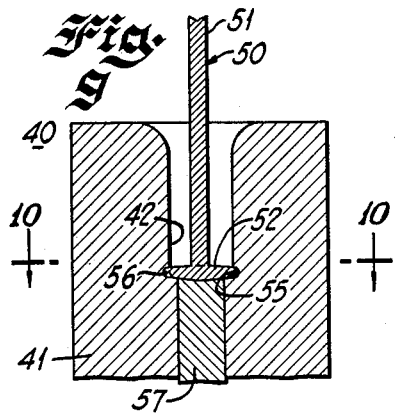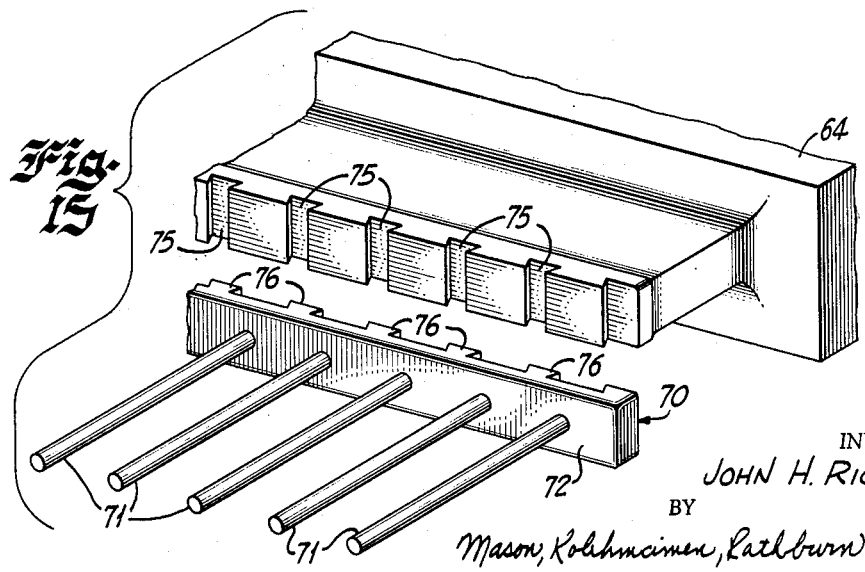

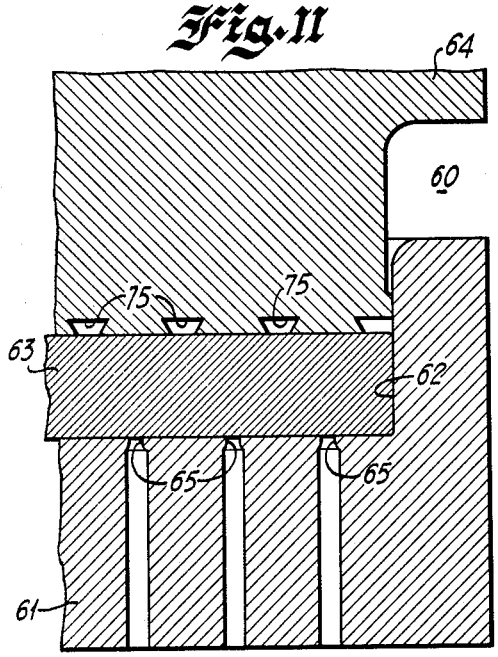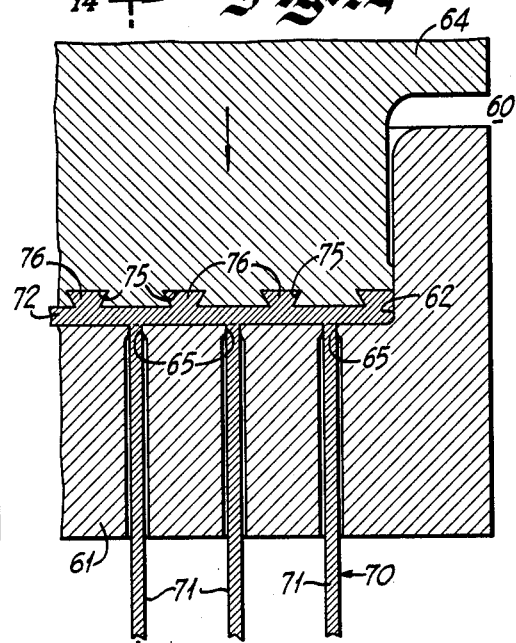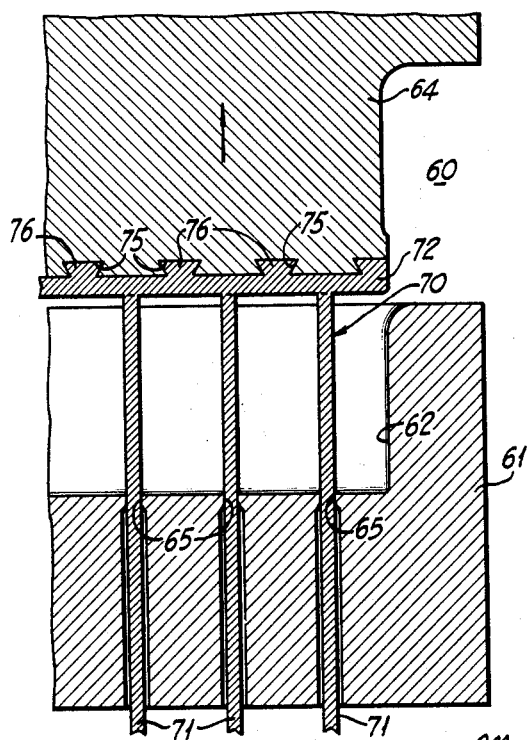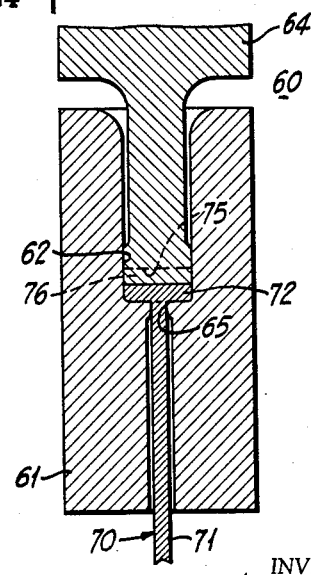

Sept. 29, 1964   J. H. RICHTER   3,150,773
MATERIAL FORMING PROCESS AND APPARATUS
Filed Jan. 4, 1963   4 Sheets-Sheet 4
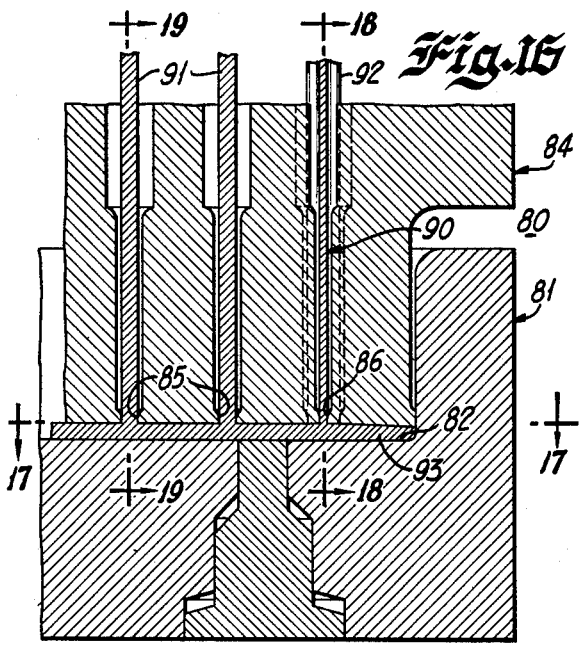
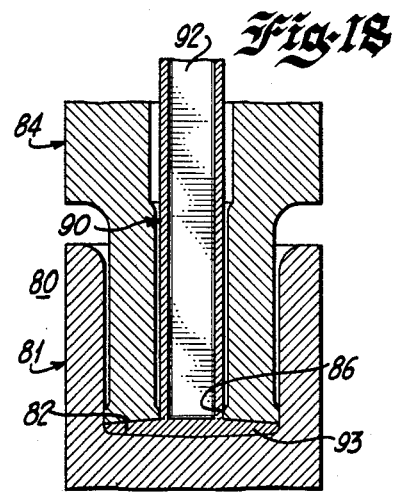
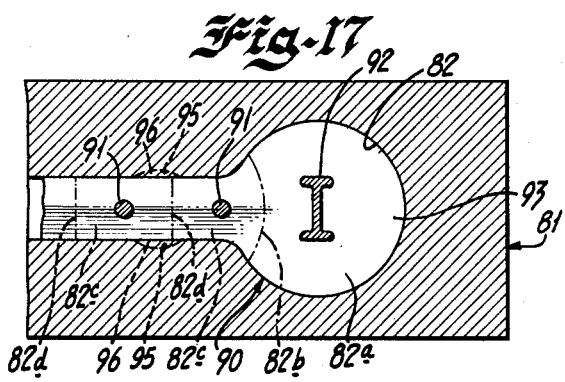
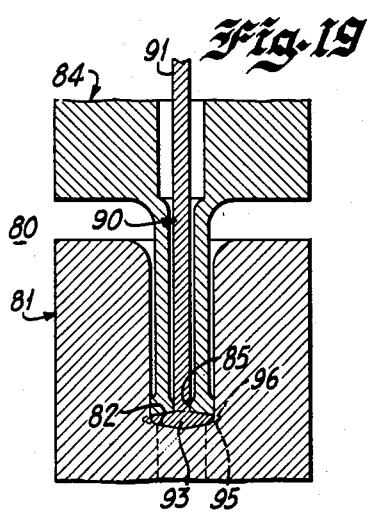
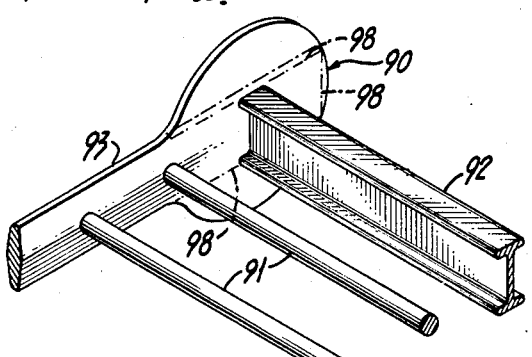
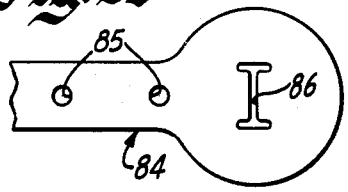
INVENTOR.
JOHN H. RICHTER
BY
Mason, Kolehmainen, Rathburn and Wyss
ATTORNEYS.

United States Patent Office 3,150,773
Patented Sept. 29, 1964

3,150,773
MATERIAL FORMING PROCESS AND APPARATUS
John H. Richter, Cynthiana, Ky., assignor to American Metal Climax, Inc., New York, N.Y., a corporation of New York
Filed Jan. 4, 1963, Ser. No. 249,415
1 Claim. (Cl. 207—6)

This invention relates to a material forming process and apparatus, and more specifically to a process of and apparatus for forming hot and cold billets of metal and other plastic materials into formed shapes by a combined extrusion and drawing process.

Conventional extrusion processes are known when hot or cold billets of metal or other material are confined in the container of an extrusion press or tooling and the material is forced out of the container through a die opening by a ram in the press which exerts pressure on the billet. Certain difficulties have heretofore been experienced in the formation of such extruded members. For example, the extruded members after they pass through the extruding die have a slight expansion in cross section so as to produce a larger extruded section on the discharge side of the die than through the die itself. While this phenomena is more marked in the hot extrusion of metal, the cold extrusion of metal similarly produces an expansion problem to a smaller degree. Moreover, a high degree of surface finish generally does not result from the extrusion of the metal through an extrusion die. Additionally, long extruded shapes may be warped or twisted when they come out of the extrusion die.

Conventional drawing processes are known wherein material is started through a drawing die which is effective to reduce its cross-sectional size and the material is pulled through the die to provide the desired reduction in cross section. While the drawing process is effectively utilized for many configurations of manufactured products, certain sections, such as those heretofore assembled from a plurality of components, do not lend themselves to the formation thereof by the mere drawing process.

Moreover, heretofore, difficulty has been experienced when simultaneously extruding a plurality of elongated members of equal length and different cross-sectional areas. There is a tendency in extruding such members for the elements having the larger cross section to extrude to the greatest length.

It has been conventional in extruding apparatus to provide a die cavity having a uniform cross-sectional area to receive the conventional rectangular or oblong billet. Where a plurality of elongated elements of varying cross section are simultaneously extruded from an extrusion press provided with such a uniform cross-sectional chamber, difficulty has heretofore been experienced in extruding the elongated elements to approximately an equal length.

Accordingly, it is an object of the present invention to provide a new and improved manufacturing process which overcomes the above-mentioned difficulties.

A further object is to provide a new and improved manufacturing process for the formation of formed sections wherein the members may be quickly and economically manufactured with a high degree of accuracy and a satisfactory surface finish.

A further object of the present invention is to provide an improved combined extrusion and drawing process.

Yet another object of the present invention is to provide an improved process for simultaneously extruding a plurality of elongated elements of different cross-sectional area to substantially the same length.

Yet a further object of the present invention is to produce a lower cost finished product which results from lower initial material cost and providing a unitary part which has heretofore been formed by assembling a plurality of components.

A further object of the present invention is to provide a new and improved extruding apparatus.

Further objects and advantages of the present invention will become apparent when the following description proceeds and the features of novelty which characterize the invention will be pointed out with particularity in the claim annexed to and forming a part of this specification.

The present invention is particularly adaptable to the manufacture of formed or extruded members having one or more elongated extruded portions. One such member is a shelf for a refrigerator and the like disclosed in my copending application, Serial No. 217,939, filed August 20, 1962. As therein disclosed, the formed member is extruded in an extrusion apparatus to provide a frame member and a plurality of spaced parallel shelf wires integrally joined to each other. The wires are formed by extrusion of a portion of a billet through the die openings of a die section. Moreover, the frame member is forged from the remainder of the billet in the die container simultaneously with the extrusion of the extruded portions.

In accordance with the present invention, an extruded member may be formed by first extruding at least a portion thereof through the die openings of an extrusion die in an extrusion press, and thereafter pull-drawing the extruded portions back through the openings of the extrusion die to reduce their cross section to within closely held tolerances and simultaneously provide a desirable surface finish to the extruded member.

In accordance with another aspect of the present invention, a plurality of elongated elements may be simultaneously extruded to approximately the same length by providing a die cavity having a cross-sectional area associated with each elongated element in approximate ratio to the cross-sectional area of the elongated element.

In accordance with yet another aspect of the present invention, the present invention relates to an extrusion press provided with a billet container of varying cross section such that the cross section of the chamber associated with each extruded element is in approximate ratio to the cross-sectional area of the element.

For a better understanding of the present invention, reference may be had to the accompanying drawings, wherein:

FIG. 1 fragmentarily illustrates in cross section an extrusion-drawing apparatus illustrating one step of the manufacturing process according to the present invention;

FIG. 2 is a fragmentary cross-sectional view of the extrusion-drawing apparatus of FIG. 1, shown in another phase of its operating cycle and illustrating another step in the improved manufacturing process according to the present invention;

FIG. 3 is a fragmentary cross-sectional view of the extrusion-drawing apparatus of FIG. 1, taken along line 3—3 of FIG. 2;

FIG. 4 is a fragmentary cross-sectional view of the extrusion-drawing apparatus of FIG. 1, shown in another phase of its operating cycle, and illustrating yet another step of the improved manufacturing process according to the present invention;

FIG. 5 is a fragmentary cross-sectional view of the extrusion-drawing apparatus of FIG. 1, taken along line 5—5 of FIG. 4;

FIG. 6 is a fragmentary view, in cross section, of the extrusion-drawing apparatus of FIG. 1, shown in another phase of its operating cycle and illustrating yet another step of the manufacturing process according to the present invention;

FIG. 7 is a fragmentary view, in cross section, of a portion of the extrusion-drawing apparatus of FIG. 1, drawn to a larger scale;

FIG. 8 is a perspective view of an extruded member formed by the extrusion drawing apparatus of FIG. 1 in accordance with the manufacturing process according to the present invention;

FIG. 9 is a fragmentary cross-sectional view of another embodiment of an extrusion-drawing apparatus utilizing the manufacturing process according to the present invention;

FIG. 10 is a cross-sectional view of the extrusion-drawing apparatus of FIG. 9, taken along line 10—10 of FIG. 1;

FIG. 11 is a fragmentary cross-sectional view of yet another modification of an extrusion-drawing apparatus utilizing the manufacturing process of the present invention and shown in one phase of its operating cycle to illustrate one of the steps of the present invention;

FIG. 12 is a fragmentary cross-sectional view of the extrusion-drawing apparatus of FIG. 11, shown in another phase of its operating cycle to illustrate another step of the manufacturing process according to the present invention;

FIG. 13 is a fragmentary cross-sectional view of the extrusion-drawing apparatus of FIG. 11, shown in another phase of its operating cycle to illustrate yet another step in the manufacturing process according to the present invention;

FIG. 14 is a fragmentary cross-sectional view of the extrusion-drawing apparatus of FIG. 11, taken along line 14—14 of FIG. 12;

FIG. 15 is a perspective view illustrating the removal of the extruded member from the ram of the extrusion-drawing apparatus of FIG. 11 according to the present invention;

FIG. 16 fragmentarily illustrates in cross section an extrusion apparatus according to another embodiment of the present invention, and illustrating one step in the manufacturing process according to another embodiment of the present invention;

FIG. 17 is a fragmentary cross-sectional view of the extrusion apparatus of FIG. 16, taken along line 17—17 of FIG. 16;

FIG. 18 is a fragmentary cross-sectional view of the extrusion apparatus of FIG. 16, taken along line 18—18 of FIG 16;

FIG. 19 is a fragmentary cross-sectional view of the extrusion apparatus of FIG. 16, taken along line 19—19 of FIG. 16;

FIG. 20 is a fragmentary view of the extrusion press of FIG. 16 illustrating the ram die section of the extrusion press and the die openings; and FIG. 21 is a perspective view of the extruded member produced in accordance with the embodiment of FIGS. 16 to 20.

Referring now to the embodiment of FIGS. 1 through 8, there is fragmentarily illustrated an extrusion-drawing apparatus 10 according to the present invention. The extrusion-drawing apparatus 10 includes a container section 11 provided with a recess forming a chamber or container 12 for the reception of a billet 13 of predetermined size. The extrusion-drawing apparatus 10 additionally includes a ram or ram die section 14 arranged to be moved toward the container section 11 to provide extruding pressure on the billet 13 in the chamber 12. As herein illustrated, the ram section 14 is provided with a plurality of die openings 15 of predetermined size and shape to provide for the extrusion and drawing of material therethrough.

A portion of the billet 13 may be extruded to form a formed or extruded member 20, best illustrated in FIG. 8, and which may be similar to that more fully described in my aforementioned copending application. The extruded member 20 is shown as a shelf, such as a refrigerator shelf, and includes a plurality of elongated extruded elements or portions 21 integrally joined and extending from a forged portion 22.

To provide for holding the extruded member 20 in the container section 11 during withdrawal of the ram die section 14 for drawing of the extruded portions 21 through the openings 15, the container section 11 is provided with a plurality of undercut portions 25 communicating with the container 12 so that upon extruding and forging of the forged portion 22 there is simultaneously formed gripping or pulling sections 26 spaced along the end length of the forged portion 22 which interlock the extruded member 20 in the container section 11. Subsequent to the forming operation, the pulling sections 26 are sheared or burnished from the remainder of the forged portion 22 by respective knockout or ejector pins 27 extending through the container section 11 into the container 12 and which are relatively movable thereto so that, as best illustrated in FIG. 6, relative movement of the ejector pins 27 is effective to eject the extruded member 20 from the container 12 by shearing or burnishing the pulling sections 26 from the extruded member 20.

To provide for lubrication of the extruded member 20 during the drawing operation, there may be provided internal lubrication ports 30 communicating with respective ones of a plurality of guide tubes 31 formed in the ram die section 14 and communicating with the openings 15. Lubrication may be fogged into the lubrication ports 30 in the form of small lubrication particles suspended in suitable medium such as air, liquid, or wax. The floated lubrication particles coagulate on the extruded sections 21 while addiitonal portions of the lubricant will collect on the internal surface of the guide tubes 31 and run downwardly therein into the openings 15.

From the above description of the extrusion-drawing apparatus and the extruded member, the method of operation thereof is believed clear. However, briefly, in accordance with the present invention, there is provided an improved manufacturing method of forming manufactured members from extrudable materials. The method includes first forming a billet 13 of a desired size and confining the billet 13 in the container 12 of an extrusion-drawing apparatus as illustrated in FIG. 1. The extrusion-drawing apparatus 10 is of the type wherein the ram section 14 provides force on the billet 13 thereby simultaneously extruding the extruded portions 21 of the extruded member 20 through the openings 15 of the ram die section 14, while maintaining the extruded portions 21 integrally connected to the remainder of the material of the billet 13 in the container 12 which now forms the forged portion 22 of the extruded member 20. The forged portion 22 is simultaneously formed with the extrusion of the extruded portions 21 in a forging type of operation due to the force of the ram die section 14. Simultaneously with the extrusion and forging of these members, the pulling sections 26 are formed in a sort of forging operation to fill the undercut portions 25 of the container 12. The extruding and forging steps of the present method are illustrated in FIGS. 2 and 3 of the drawings. Thereafter, as shown in FIG. 4, the ram die section 14 and the container section 11 are separated by relative movement thereof away from each other so that the extruded portions 21 of the extruded member 20 are pull-drawn through the openings 15 to finish-draw the extruded portions 21 to the desired cross-sectional size and to provide the desired surface finish to the extruded portions 21. The extruded member 20 is held in place in the die section 11 in interlocking relationship by the pulling sections 26 in the undercut portions 25. Finally, as illustrated in FIG. 6, the extruded member 20 is ejected from the container 12 by the ejector pins 27 which are effective to move relative to the die section 11 against the extruded member 20 to shear or burnish the pulling sections 26 from the forged portion 22 of the extruded member 20 and thereby to eject the extruded member 20.

It will be appreciated that an extruded member 20 formed in accordance with the present manufacturing method will advantageously provide an extruded member held to close dimensional tolerances and provide with a desirable surface finish and accurate alignment. The length of the forged portion 22 and the number of extruded portions 21 can be varied as desired.

Referring now to the embodiment of FIGS. 9 and 10, there is fragmentarily illustrated a container section 41 of an extrusion-drawing apparatus 40, according to another embodiment of the present invention. As therein illustrated, the container section 41 includes a container 42 adapted to receive a billet and cooperable with a ram die section (not shown) to extrude and forge an extruded member 50. The extruded member 50 includes a plurality of extruded portions 51 integrally joined to a forged portion 52.

To provide for holding the extruded member 50 within the container section 41 during pull-drawing of the extruded portions 51, the container section is provided with undercut portions 55 along its longitudinal edges in the form of opposed recessed channels and extending substantially the entire length of the forged portion 52. Extruding of a billet in the container 42 is effective to forge the pulling sections 56 integrally with the forged portion 52 and extending into the undercut portions 55. An ejector bar 57 extends substantially the entire length of the forged portion 52 in the container 42 and, as heretofore described in the embodiment of FIGS. 1 to 8, is effective when moved relative to the container section 41 into the container 42 to burnish the pulling sections 56 relative to the forged portion 52 and eject the extruded member 50.

Referring now to the embodiment of FIGS. 11 through 15, there is illustrated an extrusion-drawing apparatus 60 according to yet another embodiment of the present invention. The extrusion-drawing apparatus 60 includes a container die section 61 forming a container 62 adapted to receive a billet 63, FIG. 11, of extrudable material. Moreover, the extrusion-drawing apparatus 60 is provided with a ram section 64 adapted to move relatively toward and away from the die section 61 to extrude and forge a billet 63 in the die section 61. Moreover, to provide for the extrusion of the metal from the container 62, there is provided a plurality of die openings 65 of a desired shape and cross section, and here illustrated as being formed in the die section 61.

As best illustrated in FIG. 15, the extrusion-drawing apparatus 60 may be adapted to extrude and forge an extruded member 70 including a plurality of extruded portions 71 extending integrally from a forged portion 72. To provide for gripping and holding the extruded members 70 during the pull-drawing step of the manufacturing process, the ram section 64 is provided in its lower face with a plurality of undercut or dovetail portions 75. Extrusion of the extruded portions 71 and formation of the forged portion 72 is effective simultaneously to forge or otherwise form a plurality of pulling sections 76 in the form of dovetails, formed within the undercut portions 75 of the ram section 64, as best illustrated in FIG. 12.

In operation, the extrusion drawing apparatus 60 is effective in accordance with the present invention to extrude and forge a billet 63 placed within the container 62, FIG. 11, by extrusion thereof. The extruded portions 71 are formed by forcing of the metal of the billet 63 through the openings 65 in the container die section 61 upon an extruding force being applied by the ram section 64. Simultaneously with the extrusion of the extruded portions 71, the forged portion 72 is formed of the remaining material in the billet 63. At the same time, the dovetailed pulling sections 76 are interlockingly formed with the complementary undercut portions 75 of the section 64. Withdrawal of the ram section 64 away from the die section 61, as best illustrated in FIG. 13, is effective to draw-pull the extruded portions 71 back through the openings 65 to provide for final sizing of the extruded portions 71 and the provision of suitable surface finish thereto. Once the ram section 64 has been moved away from the container die section 61 sufficiently for the extruded member 70 to clear the container die section 61, the extruded member 70 may be slid transversely out of interlocking engagement with the ram section 64, as illustrated in FIG. 15, to remove the extruded member 70 from the ram section 64. Subsequently, the pulling section 76 may be removed from the forged portion 72 by shearing or other known means, if desired.

Referring now to the embodiment of FIGS. 16 through 21, there is illustrated an extrusion drawing apparatus 80 according to yet another embodiment of the present invention. The extrusion drawing apparatus 80 includes a container section 81 forming a container 82 adapted to receive a billet of extrudable material, such as aluminum. The extrusion drawing apparatus 80 is provided with a ram die section 84 adapted to move relatively toward and away from the container section 81 to extrude and forge a billet in the container section 81. Moreover, to provide for the extrusion of the metal from the chamber 82, there is provided a plurality of die openings 85 and 86 in one of the sections, here shown in the ram die section 84. It will be seen that the die opening 86 is of larger cross-sectional area than the die openings 85.

As best illustrated in FIGS. 17 and 21, the extrusion-drawing apparatus 80 may be adapted to extrude and forge an extruded member 90 including a plurality of extruded portions 91 of circular, relatively small cross-sectional area corresponding to the cross-sectional area of the die openings 85, and a plurality of extruded portions 92 of generally I-shape and relatively larger cross-sectional area than the extruded portion 91 corresponding to the cross-sectional area of the die opening 86. The extruded portions 91 and 92 extend integrally from a forged portion 93.

To provide for gripping and holding the extruded members 90 during a pull-drawing step of the manufacturing process, if desired, the container section 81 is provided in its lower face with a plurality of undercut portions 95, FIG. 19, similar to that illustrated in the embodiments of FIGS. 1 through 8. Extrusion of the extruded portions 91 and 92 and formation of the forged portion 93 is effective simultaneously to forge or otherwise form a plurality of pulling sections 96 formed within the undercut portions 95 of the container section 81.

In accordance with the present invention, it will be seen that certain of the extruded portions, identified as 92, are of larger cross-sectional area than other of the extruded portions, identified at 91. In order to provide for the simultaneous extrusion of all the extruded portions 91 and 92 to approximately the same length, the chamber 82 is formed with an area associated with each of the extruded portions 91 and 92 in approximate ratio to the cross-sectional area of the extruded portions. More specifically, referring to FIG. 17, the chamber 82 is formed with an enlarged portion 82a and associated with the extruded portion 92 of larger cross-sectional area, as indicated by the imaginary boundary line 82b. Additionally, the chamber 82 has a plurality of areas or portions 82c associated with each of the extruded portions 91 of lesser cross-sectional area as indicated by the imaginary boundary line 82b and additional imaginary boundary lines 82d. It will be seen that, in accordance with the present invention, the ratio of the portions 82a and 82c is proportional to the cross-sectional areas of the extruded portions 92 and 91. In this manner, the extruded portions 92 and 91 of different cross-sectional area will be extruded to approximately the same length by a simultaneous stroke of the ram die section 84. Accordingly, the extruded portions 91 and 92 may be trimmed to an equal length with a minimum amount of waste material.

It has been found, in accordance with the present invention, that the shape of the billet used in the embodiment of FIGS. 16 to 21 need not confrom to the shape of the chamber 82, but the billet may have the conventional rectangular shape, substantially equal to the length of the chamber 82; or the billet may have the common generally rectangular shape with large radius end sections and having a length substantially equal to the length of the chamber 82. Of course, it is understood that the billet may also have a shape generally conforming to the shape of the chamber 82.

After formation of the extruded member 90 in the extrusion-drawing apparatus 80, the extruding member 90 may be ejected from the extrusion-drawing apparatus 80 in a manner similar to that described in the embodiment of FIGS. 1 to 8. Moreover, if desired, the pulling sections 96 may subsequently be removed. Additionally, undesired portions of the forged portion 93 may be removed, for example, the areas illustrated outside of the lines 98 in FIG. 21, which have been formed due to the shape of the chamber 82. Removal of the metal outside of the lines 98 will be effective to provide a generally rectangular shape to the forged portion 93.

The present invention has been described by reference to several embodiments thereof, and it will be apparent that numerous other modifications and embodiments may be devised by those skilled in the art and it is intended by the appended claim to cover all such modifications and embodiments which fall within the true spirit and scope of the present invention.

What is claimed as new and desired to be secured by Letters Patent of the United States is:

An extrusion press for extruding members of the type having a plurality of extruded portions of different cross-sectional area and of substantially the same length comprising a ram section, a container section including a container for confining a billet, one of said sections including die openings for extruding metal, at least one of said sections being movable relative to the other to provide an extruding force to a billet confined in said container, the cross-sectional area of each portion of the container associated with each of said die openings being in proportion to the cross-sectional area of the openings.

References Cited in the file of this patent

UNITED STATES PATENTS

| | | |
|---|---|---|
| 1,661,594 | Born | Mar. 6, 1928 |
| 2,031,014 | Staples | Feb. 18, 1936 |
| 2,720,310 | Yack et al. | Oct. 11, 1955 |

FOREIGN PATENTS

| | | |
|---|---|---|
| 429,216 | Germany | May 22, 1926 |
| 447,720 | Germany | July 28, 1927 |
| 1,127,305 | Germany | Apr. 12, 1962 |